(12) United States Patent
Gulker

(10) Patent No.: US 10,180,372 B2
(45) Date of Patent: Jan. 15, 2019

(54) PORTABLE AEROACOUSTIC WIND TUNNEL AND METHOD OF TESTING A VEHICLE FOR WIND NOISE

(71) Applicant: Ford Motor Company, Dearborn, MI (US)

(72) Inventor: William Gulker, Beverly Hills, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 72 days.

(21) Appl. No.: 15/463,808

(22) Filed: Mar. 20, 2017

(65) Prior Publication Data
US 2017/0292896 A1  Oct. 12, 2017

Related U.S. Application Data

(60) Provisional application No. 62/319,437, filed on Apr. 7, 2016.

(51) Int. Cl.
*G01M 9/04* (2006.01)
*G01M 17/007* (2006.01)

(52) U.S. Cl.
CPC ............ *G01M 9/04* (2013.01); *G01M 17/007* (2013.01)

(58) Field of Classification Search
CPC ...... G01M 17/007; G01M 9/04; G01M 9/065; G01M 9/00; G01M 17/00
See application file for complete search history.

(56) References Cited

U.S. PATENT DOCUMENTS

| | | | | |
|---|---|---|---|---|
| 5,495,754 A | * | 3/1996 | Starr, Jr. ................. | G01M 9/02 73/146 |
| 7,254,998 B2 | * | 8/2007 | Rueger .................... | G01M 9/06 73/147 |
| 7,832,265 B1 | * | 11/2010 | Gong ................... | A63B 67/002 73/147 |
| 9,778,135 B1 | * | 10/2017 | Beckman ................ | G01M 9/04 |
| 2012/0221257 A1 | * | 8/2012 | Froncioni ............... | G01M 9/06 702/45 |
| 2017/0212005 A1 | * | 7/2017 | Walter ..................... | G01M 9/04 |

FOREIGN PATENT DOCUMENTS

GB    619250 A  *  3/1949  .............. G01M 9/02

* cited by examiner

*Primary Examiner* — Francis C Gray
(74) *Attorney, Agent, or Firm* — Marla Johnston; Brooks Kushman P.C.

(57) ABSTRACT

A portable aeroacoustic wind tunnel includes a modular building structure. The wind tunnel is assembled together on-site at an assembly plant outdoors and on the ground and disassembled into sub-assemblies for transportation. A separate control building includes fan controls, acoustic measurement controls and windows for visual observation. A portable generator provides power to the wind tunnel that is equipped with acoustic dampening features. The modular building structure and control building can be shipped in a cost-effective manner.

16 Claims, 5 Drawing Sheets

PORTABLE AEROACOUSTIC WIND TUNNEL AND METHOD OF TESTING A VEHICLE FOR WIND NOISE

CROSS-REFERENCE TO RELATED APPLICATIONS

This application claims the benefit of U.S. provisional application Ser. No. 62/319,437 filed Apr. 7, 2016, the disclosure of which is hereby incorporated in its entirety by reference herein.

TECHNICAL FIELD

This disclosure relates to a portable apparatus for studying noise generation via aerodynamic forces interacting with surfaces of a vehicle.

BACKGROUND

Vehicles are tested for wind noise issues that are important to providing a quality driving experience. Identifying wind noise issues early in a vehicle launch reduces the need to correct issues after vehicles are assembled and reduces the cost of corrective measures.

At an assembly plant when a new vehicle is launched one or more vehicles are shipped to an offsite aeroacoustic wind tunnel to test the vehicles and identify the root cause of any wind noise issues. Shipping vehicles to an offsite wind tunnel is time consuming and expensive. Vehicles produced during the time that the vehicles are shipped and tested may require expensive remedial measures to eliminate the wind noise issues.

Another approach to identifying wind noise issues is to drive the vehicles on the road. Evaluating wind noise performance on the road is difficult because of variable environmental factors and it may be difficult to locate a public road with little traffic near the assembly plant that is suitable for testing at highway driving speeds.

This disclosure is directed to solving the above problems and other problems as summarized below.

SUMMARY

The problem of identifying wind noise issues during a vehicle launch at an assembly plant is addressed by providing a portable aeroacoustic wind tunnel. The portable wind tunnel is designed to be assembled at the assembly plant in one or two days to conduct tests and disassembled after the wind noise issues are identified and corrected. The portable aeroacoustic wind tunnel may then be shipped to the next assembly plant undergoing a new vehicle launch. The portable aeroacoustic wind tunnel reduces the response time for testing for a wind noise issue from 3 to 14 days to a few hours. The time and cost savings make it feasible to increase the vehicle sample size for a series of tests from 3 to 5 vehicles to more than 10 vehicles.

The structure of the portable aeroacoustic wind tunnel includes a two part modular building structure that is disassembled into sub-assemblies. In addition, a separate control building is provided that includes fan controls, acoustic measurement controls and windows for visual observation. If a convenient source of power from the electrical power grid is not available, a portable generator may be used that is provided with acoustic dampening. The modular building structure and control building can be shipped in a cost-effective manner on three flatbed trucks.

The modules are assembled together onsite to create an acoustically conditioned single pass wind tunnel. The single pass wind tunnel creates a large volume of air flow that is directed toward a vehicle parked behind a nozzle. The air flow from the wind tunnel aggravates potential wind noise issues when directed at the front of a vehicle. Air flow speed measured at 125 feet behind the nozzle must be reduced to less than 65 kph.

The portable aeroacoustic wind tunnel includes one or more fans that are powered by either a 500 kw portable generator or by connection to a power grid circuit that is capable of providing 800 Amps.

The portable aeroacoustic wind tunnel includes a visual and audible warning system to warn persons in the area around the portable aeroacoustic wind tunnel of the high speed air flow.

According to one aspect of this disclosure, a portable aeroacoustic wind tunnel system is provided that includes a first wind tunnel module, a second wind tunnel module that is configured to be assembled to the first wind tunnel module, and a control building. The wind tunnel modules and the control building are independently transportable to be temporarily installed outdoors on the premises of a vehicle assembly plant.

Other features of the wind tunnel include a nozzle defining a discharge opening of at least 50 square feet that provides air flow through the nozzle at speeds of up to 130 kph. The wind tunnel modules may be installed on an asphalt or gravel surface having less than a 1% grade. The vehicle may be positioned on the ground behind a discharge opening defined by the nozzle. The vehicle may be angularly oriented to simulate yaw angles of ±10°.

The background noise from the wind tunnel and power sources as measured in the vehicle disposed behind the nozzle is more than 6 decibels less than the wind noise to be measured in the vehicle while the wind tunnel is creating a 130 kph stream of air from the nozzle. The wind tunnel background noise generated while producing a 130 kph stream of air as measured 2 meters downstream of the exit nozzle with no vehicle in the air stream is less than 82 dB at 125 Hz, 75 dB at 250 HZ, 71 dB at 500 Hz, 61 dB at 2000 Hz, and 66 dB at 4000 Hz.

The system may further comprise one or more fans and the control building is electrically connected to the wind tunnel modules to control the fan or fans. The control building may further comprise at least one window and is positioned for visually observing a vehicle through the window during testing. The system may also further comprise a portable generator that is electrically connected to the control building and the fan to provide power for the fan and the control building.

According to another aspect of this disclosure, a method is disclosed for testing a vehicle for wind noise with an open circuit aeroacoustic wind tunnel formed in at least two modules and a control building. The method comprises the steps of assembling the two modules together and positioning the control building adjacent the wind tunnel outdoors on the premises of a vehicle assembly plant. The vehicle to be tested is positioned behind a discharge nozzle of the wind tunnel that blows air on a vehicle equipped with a microphone.

According to other aspects of this disclosure, the method may further include the step of disassembling the two modules for transportation to a second vehicle assembly plant. The method may further comprise the step of separately transporting the two modules and the control building on separate transport vehicles to the vehicle assembly plant.

The method may be used with a wind tunnel that includes at least one fan and may further comprise the steps of providing a portable generator, and connecting the portable generator electrically to the fans.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
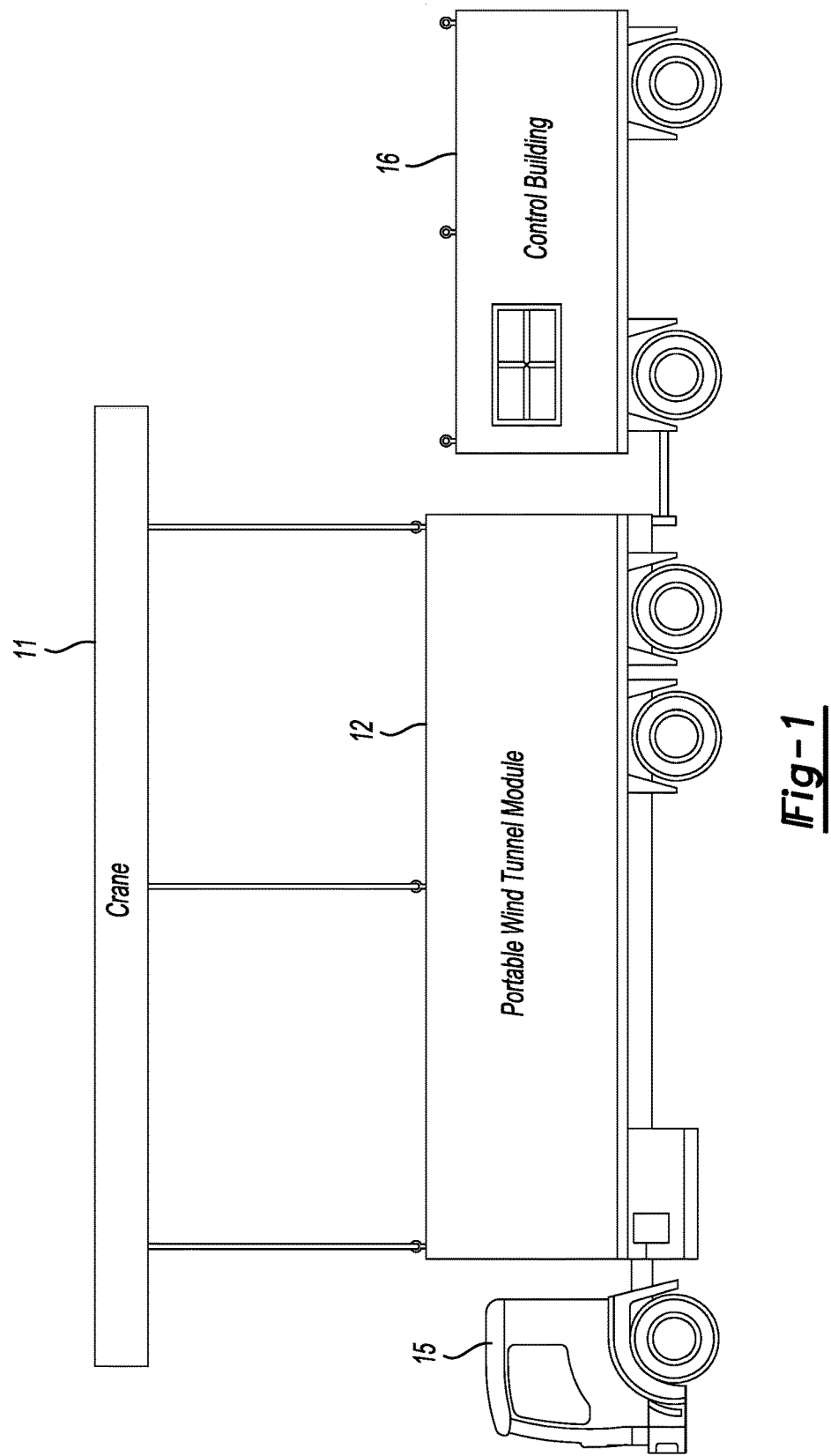
FIG. 1 is a side elevation view of a portable wind tunnel module and a control building on a flatbed truck.
Figure 2:
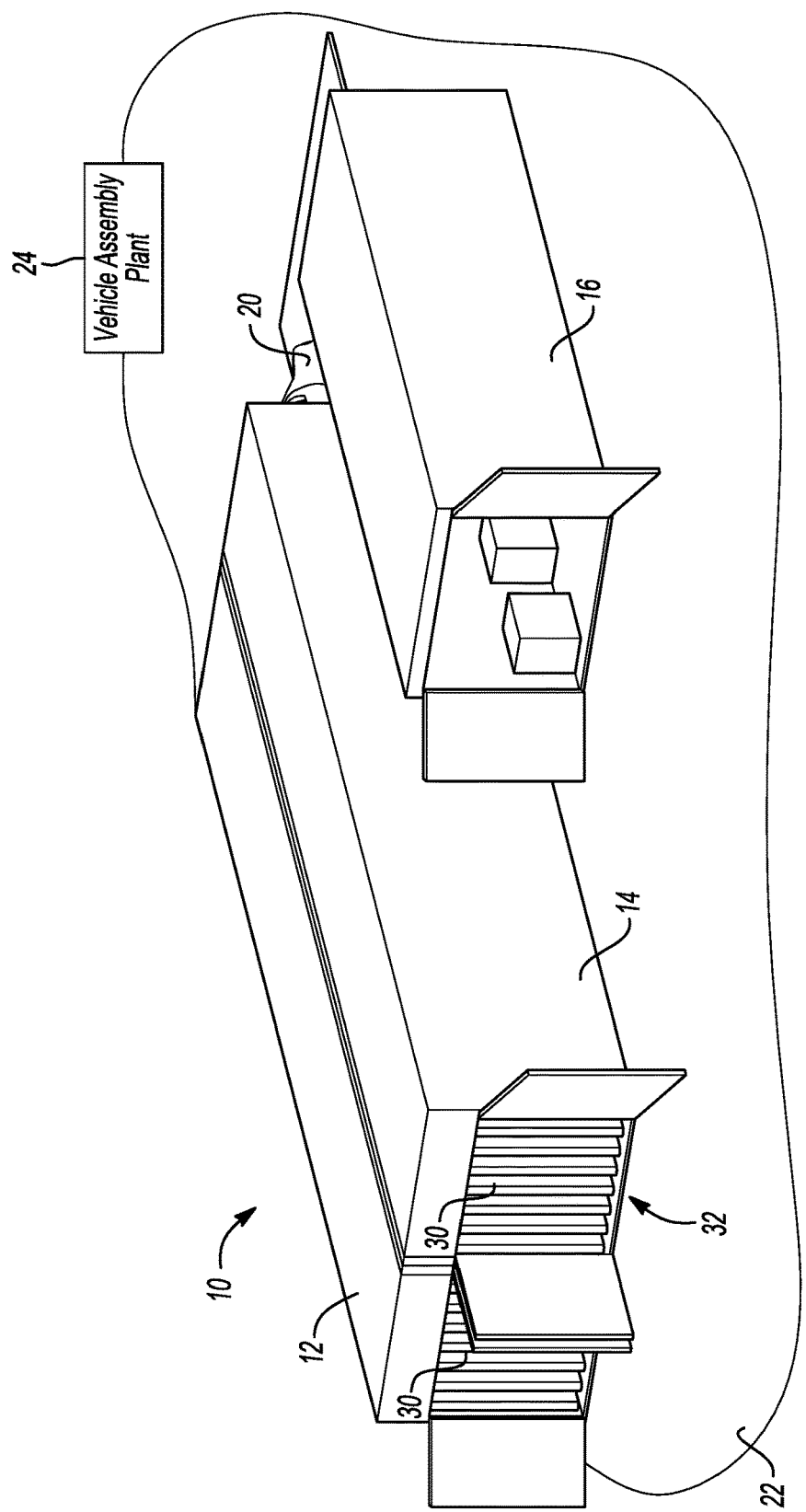
FIG. 2 is a front perspective view of a portable areoacoustic wind tunnel and control building set up on the ground at a vehicle assembly plant.
Figure 3:
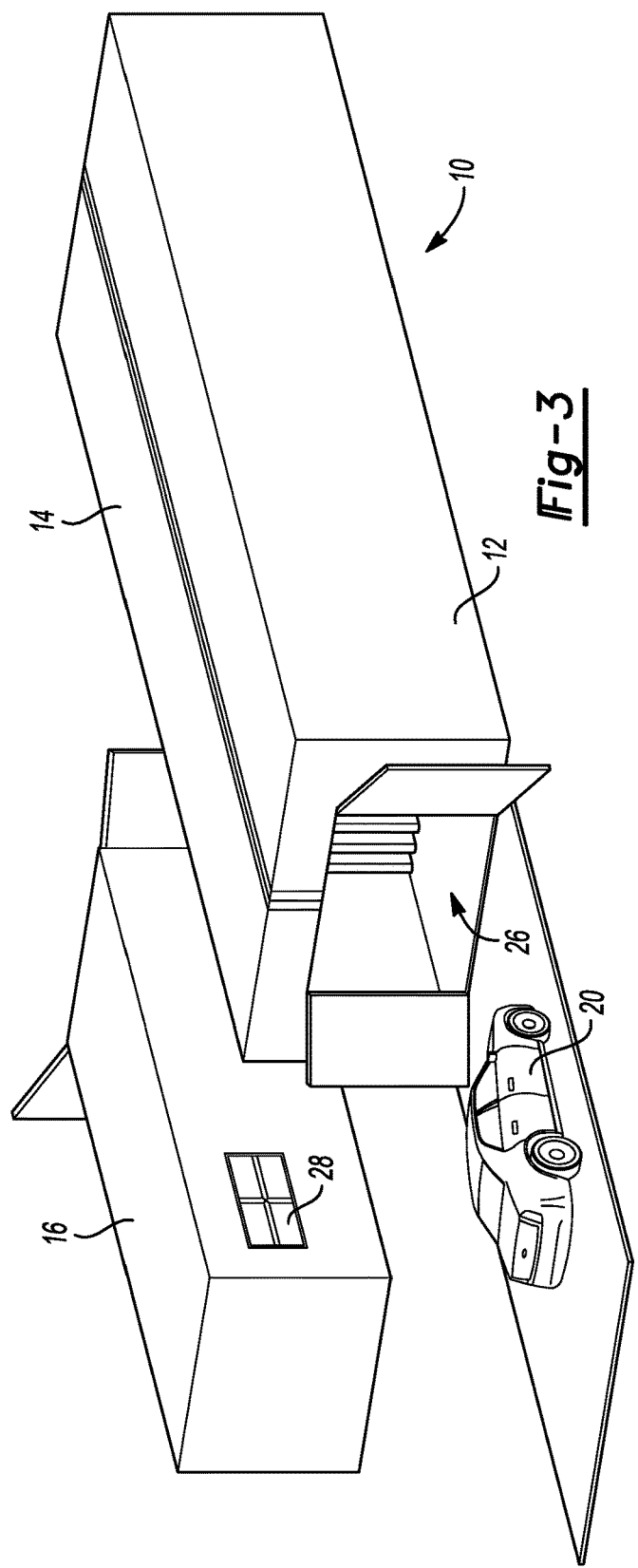
FIG. 3 is a rear perspective view of the portable aeroacoustic wind tunnel and control building.

Referring to FIGS. 1-3, a portable aeroacoustic wind tunnel 10 is illustrated in FIGS. 2 and 3. The portable aeroacoustic wind tunnel 10 includes a first wind tunnel module 12 and a second wind tunnel module 14 that are assembled together on opposite sides of a longitudinal plane. A crane 11 is illustrated in FIG. 1 in position to lift a first portable wind tunnel module 12 onto or off of the flatbed truck 15. A control building 16 is shown on a separate flatbed trailer attached to the flatbed truck 15.

The portable aeroacoustic wind tunnel 10 is an open circuit airline wind tunnel that provides a flow of air from within the wind tunnel 10 to the outside without any recirculation of the air as is generally the practice with stationary wind tunnels used to test automotive vehicles.

Referring to FIG. 3, the control building 16 is preferably oriented with an observation area overlooking a test vehicle 20 through one or more windows 28. The control building 16 includes a controller that monitors inputs from one or more microphones 29 in the vehicle 20. The control building 16 also includes the controls for the fans 36 in the wind tunnel 10. The test vehicle 20 may be set up to directly face the discharge opening 26 at a yaw angle of 0°. Alternatively, the test vehicle 20 may be set up at an angle relative to the discharge opening 26 to simulate yaw angles of up to 10° and thereby simulate the vehicle traveling through a curve. The control building 16 is preferably connected to the test vehicle 20 and microphones 29 by a digital cable. A test technician may also be seated in the test vehicle 20 to listen for wind noises.

With continued reference to FIG. 3, the portable aeroacoustic wind tunnel 10 is again shown, but from the back end, with the test vehicle 20 in position for testing. The first and second wind tunnel modules 12 and 14 are disposed on an asphalt or gravel surface 22. It should be understood that, due to the weight of the modules, there is no need to provide a footer or foundation for the portable aeroacoustic wind tunnel 10. Setting up the wind tunnel directly on an asphalt or gravel surface having a slope of less than 1° saves considerable cost. For convenience, the portable aeroacoustic wind tunnel 10 is intended to be set up on the grounds of a vehicle assembly plant 24 so that the vehicles may be taken directly from the vehicle assembly plant 24 and positioned behind the discharge opening 26 of the wind tunnel 10 for wind noise testing.

Figure 4:
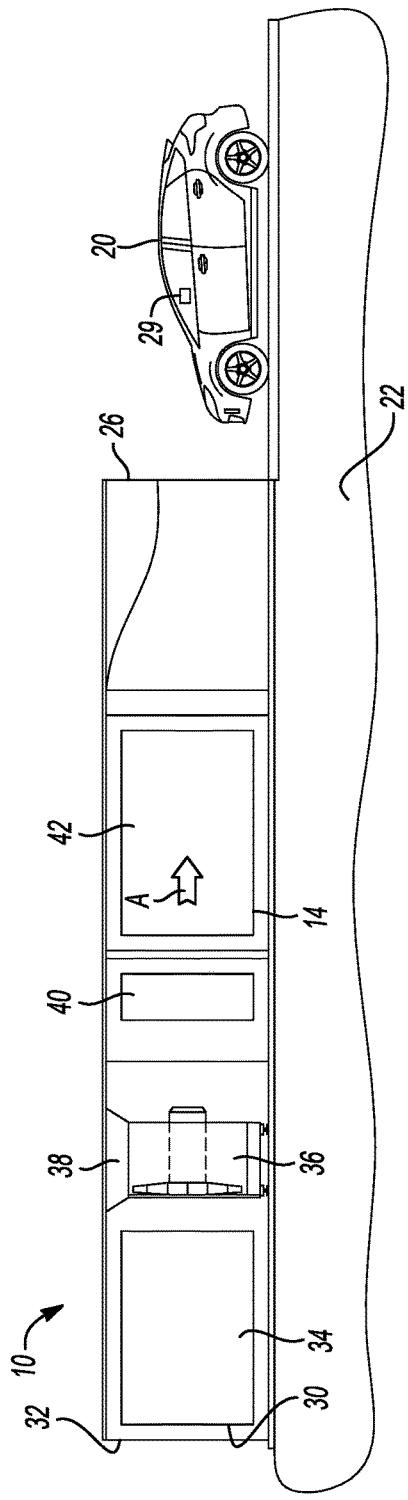
FIG. 4 is a side elevation view of the portable aeroacoustic wind tunnel with a test vehicle in position.
Figure 5:
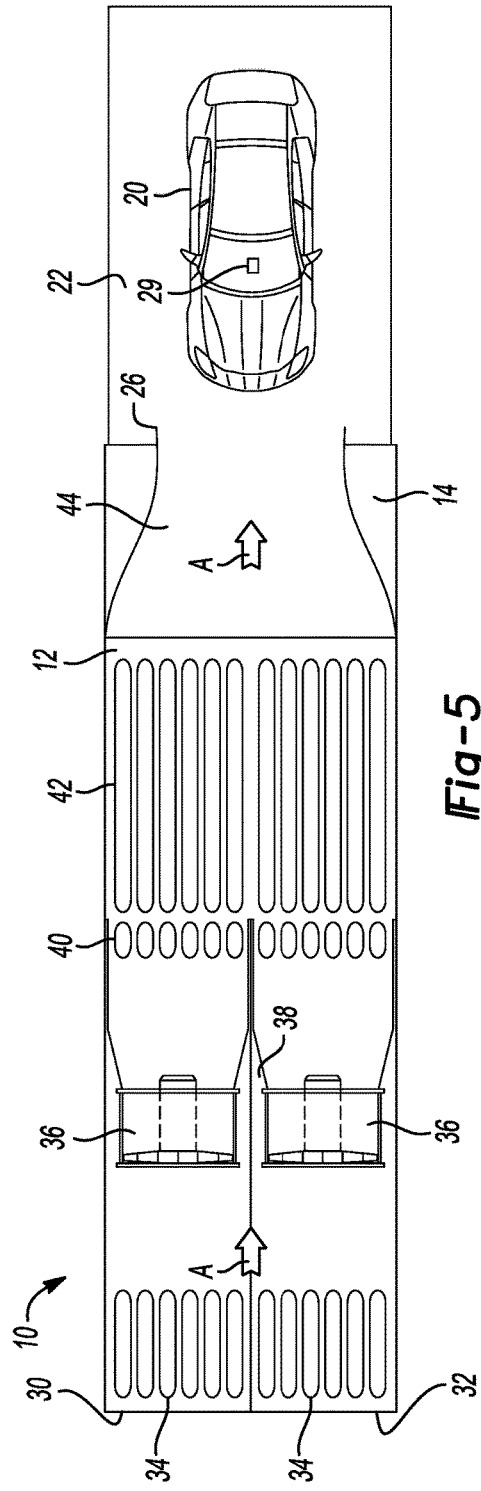
FIG. 5 is a top plan view of the portable aeroacoustic wind tunnel with the test vehicle in position.

Referring to FIGS. 4 and 5, the portable aeroacoustic wind tunnel 10 is shown to include the first wind tunnel module 12 and second wind tunnel module 14 that are secured together with a test vehicle 20 disposed behind a discharge opening 26 in the assembled portable wind tunnel 10. The wind tunnel 10 includes an inlet 30 through which air is drawn into the wind tunnel 10. Air flowing through the wind tunnel 10 is represented by air flow arrow "A".

The inlet 30 is located at the front end 32 of the portable aeroacoustic wind tunnel 10. A plurality of inlet baffles 34 are provided at the front end 32 inside the inlet 30 for the purpose of reducing noise emitted from the front end 32. Two 250 horsepower fans 36 are arranged downstream from the inlet 30 and are secured within the wind tunnel 10. One of the fans 36 is provided in each of the first and second wind tunnel modules 12 and 14. A fan shroud 38 prevents the circulation of air flow around the fans 36. A plurality of downstream baffles 40 are disposed between the fans 36 and a plurality of exit baffles 42. The baffles 34, 40 and 42 may be formed from perforated aluminum sheets and filled with fiberglass. The perforated aluminum sheets filled with fiberglass reduce noise emitted through the discharge opening 26 from the fans 36.

Air flowing through the exit baffles 42 enters a nozzle 44 that has tapered walls leading to the 50 square foot discharge opening 26. Air flowing from the nozzle 44 into the discharge opening 26 is directed toward the test vehicle 20. The test vehicle 20 is preferably provided with a microphone 29 or an acoustic head of a test mannequin that may include several microphones. The output from several microphones 29 facilitates determining the location of wind noise in the test vehicle 20.

Figure 6:
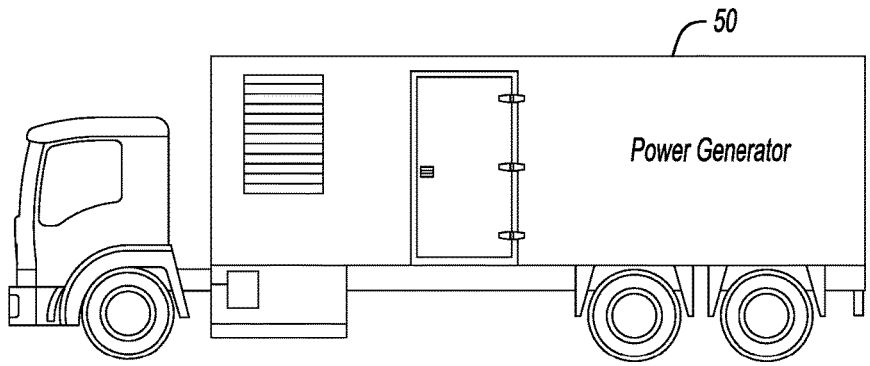
FIG. 6 is a side elevation view of a power generator disposed on a transport vehicle.

Referring to FIG. 6, a portable generator 50 is illustrated that is disposed on a flatbed truck 15. The portable generator 50 is preferably a 500 kw generator that is housed in an enclosed trailer. The trailer housing the generator is preferably provided with acoustic noise dampening features. The generator 50 is rated to provide about 800 amps of current.

Figure 7:
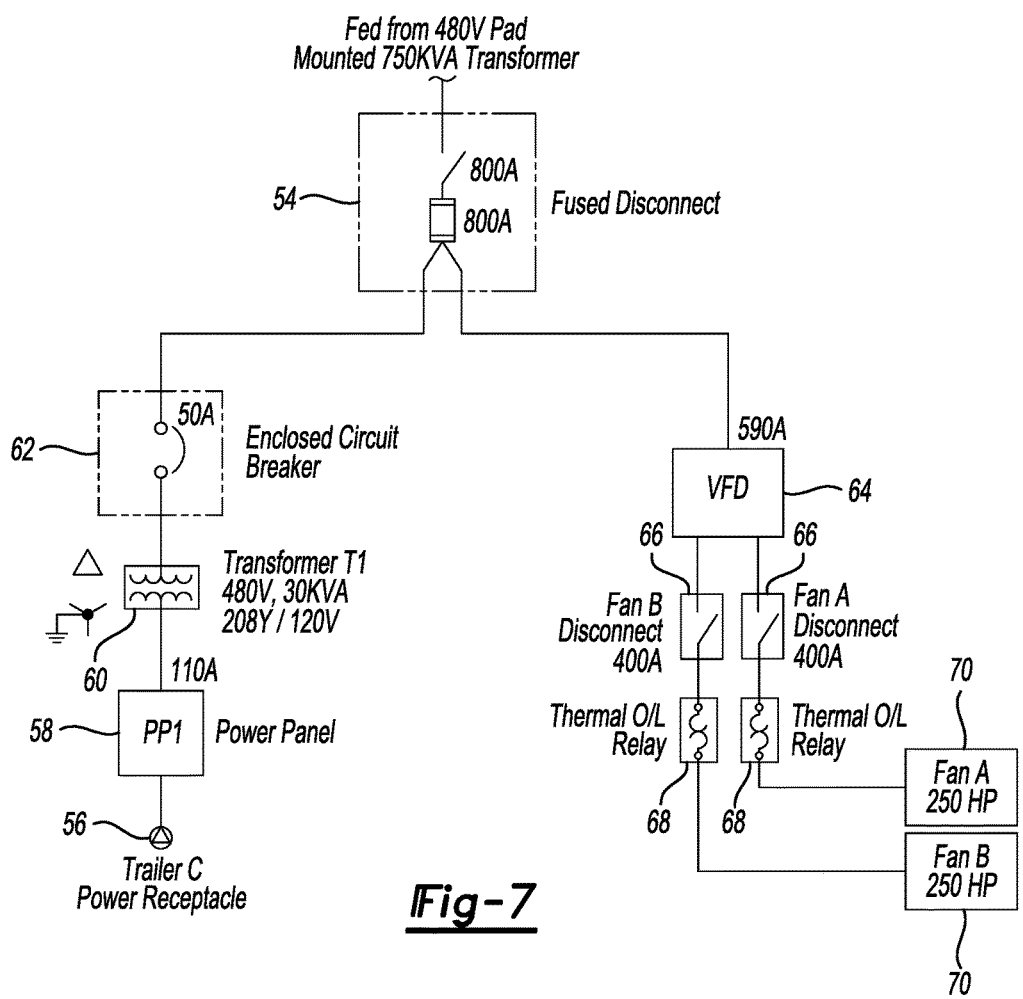
FIG. 7 is a wiring diagram for powering the fans of the portable aeroacoustic wind tunnel from a power generator.

Referring to FIG. 7, a wiring diagram 52 is provided showing that electricity from the portable generator is fed from a 480 volt pad mounted 750 kva transformer. Alternatively, the power for the wind tunnel 10 may be provided from a 480 volt feed from the power grid. Power is provided through a fused disconnect 54 to provide power to the power receptacle 56 in the control building 16 (shown in FIGS. 1-3) on the trailer (C). Power from the power receptacle 56 is provided to a power panel (PPI) 58 and to a transformer (T1) 60 that converts the 480 volt, 30 kva to 208 Y/120 volt output. A circuit breaker 62 is also provided in the control building 16. Power is provided from the control building to the variable fan drive (VFD) 64. Power from the VFD 64 is provided to fan A and fan B through disconnect 66 and a thermal overload (O/L) relay 68. Power is then provided to fan A and fan B 70 that correspond to the fans 36 shown in FIGS. 4 and 5.

The portable aeroacoustic wind tunnel 10 is capable of providing air speeds at the discharge opening 26 of up to 130 kph. The portable aeroacoustic wind tunnel 10 is an open circuit air line wind tunnel that also may be referred to as a transportable aeroacoustic wind noise audit apparatus. The wind tunnel 10 is configured to be set up in two days or less and may be transported on three standard width flatbed trailers 15. The portable aeroacoustic wind tunnel 10 is configured to be torn down in less than two days so that it may be shipped to different assembly plants to support vehicle launch operations.

The portable aeroacoustic wind tunnel 10 is designed to meet specific background noise specifications stated in terms of noise generated while producing a 130 kph stream of air as measured 2 meters downstream of the exit plane of the nozzle with no vehicle in the air stream, particularly, the background noise specification is less than 82 dB at 125 Hz, 75 dB at 250 Hz, 71 dB at 500 Hz, 66 dB at 1000 Hz, 61 dB at 2000 Hz, and 66 dB at 4000 Hz.

The background noise inside the vehicle must be 10 decibels less than the wind noise to be tested or measured in the car. Background noise is attenuated in the wind tunnel 10 and the power generator 50 to be reduced.

The wind tunnel 10 may also be provided with a warning system including warning lights and audible alarms. The warning lights and audible alarms may be provided on the control room or on the wind tunnel 10 as appropriate. Barriers are preferably set up around the discharge opening 26 of the wind tunnel 10 as an added safety precaution due to the high speed wind created by the wind tunnel 10.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A portable aeroacoustic wind tunnel system for testing a vehicle, comprising:
   a first wind tunnel module;
   a second wind tunnel module that is configured to be assembled to the first wind tunnel module;
   a control building, wherein the wind tunnel modules and the control building are independently transportable to be temporarily installed outdoors at a vehicle assembly plant; and
   a nozzle defining a discharge opening, wherein the vehicle is positioned behind the discharge opening and angularly oriented to simulate a yaw angle of ±10°.

2. The system of claim 1 further comprising:
   a nozzle defining a discharge opening of at least 50 square feet that provides an air flow through the nozzle at speeds of up to 130 kph.

3. The system of claim 1 wherein the wind tunnel modules are installed on an asphalt surface having less than a 1% grade.

4. The system of claim 1 wherein the wind tunnel modules are installed on a gravel surface having less than a 1% grade.

5. The system of claim 1 wherein a background noise as measured in the vehicle disposed behind the nozzle is more than 10 decibels less than a wind noise to be measured in the vehicle.

6. The system of claim 1 wherein a background noise generated while portable aeroacoustic wind tunnel system producing a 130 kph stream of air as measured 2 meters downstream from an exit plane of the nozzle with no vehicle in the air stream is less than 82 dB at 125 Hz, 75 dB at 250 Hz, 71 dB at 500 Hz, 66 dB at 1000 Hz, 61 dB at 2000 Hz, and 66 dB at 4000 Hz.

7. A portable aeroacoustic wind tunnel system comprising:
   a first wind tunnel module;
   a second wind tunnel module that is configured to be assembled to the first wind tunnel module;
   a control building, wherein the wind tunnel modules and the control building are independently transportable to be temporarily installed outdoors at a vehicle assembly plant; and
   one or more fans, disposed in the first and second wind tunnel modules and wherein the control building is electrically connected to the wind tunnel modules to control the fans.

8. The system of claim 1 wherein the control building further comprises:
   at least one window, and wherein the control building is positioned for visually observing a vehicle through the window during testing.

9. The system of claim 1 further comprising:
   a portable generator; and
   a fan, wherein the portable generator is electrically connected to the control building and the fan to provide power for the fan and the control building.

10. A method of testing a vehicle for wind noise with an open circuit aeroacoustic wind tunnel formed in at least two modules and a control building, comprising:
    assembling the modules together outdoors at a vehicle assembly plant;
    positioning the control building adjacent the wind tunnel;
    positioning the vehicle behind a wind tunnel discharge nozzle at a simulated yaw angle of ±10°; and
    blowing air on a vehicle equipped with one or more microphones.

11. The method of claim 10 further comprising:
    disassembling the two modules for transportation to a second vehicle assembly plant.

12. The method of claim 10 further comprising:
    transporting the two modules individually and the control building each on a separate transport vehicle to the vehicle assembly plant.

13. The method of claim 10 wherein the wind tunnel includes at least one fan, the method further comprising:
    providing a portable generator; and
    connecting the portable generator electrically to the at least one fan of the wind tunnel.

14. A method of testing a vehicle for wind noise with an open circuit aeroacoustic wind tunnel formed in at least two modules and a control building, comprising:
    assembling the modules together outdoors at a vehicle assembly plant positioning the control building adjacent the wind tunnel;
    positioning the vehicle behind a wind tunnel discharge nozzle;
    blowing air on a vehicle equipped with one or more microphones; and
    measuring a background noise 2 meters downstream from an exit plane of the discharge nozzle while the open circuit aeroacoustic wind tunnel is producing a 130 kph stream of air with no vehicle in the air stream to determine whether the background noise is more than a predetermined level over a range of frequencies between 125 Hz and 4000 Hz.

15. A method of testing a vehicle for wind noise with an open circuit aeroacoustic wind tunnel formed in at least two modules and a control building, comprising:
   assembling the modules together outdoors at a vehicle assembly plant;
   positioning the control building adjacent the wind tunnel;
   positioning the vehicle behind a wind tunnel discharge nozzle;
   blowing air on a vehicle equipped with one or more microphones; and
   measuring a background noise in the vehicle to determine whether the background noise is more than 6 decibels less than the wind noise to be measured in the vehicle during a test.

16. The method of claim 10 wherein the step of assembling the two modules is performed on a surface without a structural foundation.

\* \* \* \* \*